Dec. 2, 1969 S. TESZNER ET AL 3,482,151

BISTABLE SEMICONDUCTOR INTEGRATED DEVICE

Filed April 10, 1968 8 Sheets-Sheet 1

INVENTORS:
Stanislas TESZNER, Paul DURAND,
Philippe H. MOREL, Pierre E. BRIERE
By [signature]
ATTORNEY

BISTABLE SEMICONDUCTOR INTEGRATED DEVICE

Filed April 10, 1968

INVENTORS:
Stanislas TESZNER, Paul DURAN
Philippe H. MOREL, Pierre E. BRIERE
By
ATTORNEY Dec. 2, 1969 S. TESZNER ET AL 3,482,151

BISTABLE SEMICONDUCTOR INTEGRATED DEVICE

Filed April 10, 1968 8 Sheets-Sheet 3

INVENTORS:
Stanislas TESZNER, Paul DURAN[illegible]
Philippe H. MOREL, Pierre E. BRIERE
By [signature]
ATTORNEY

BISTABLE SEMICONDUCTOR INTEGRATED DEVICE

Filed April 10, 1968 8 Sheets-Sheet 4

INVENTORS

Stanislas TESZNER, Paul DURAND
Philippe H. MOREL, Pierre E. BRIERE
By [signature]
ATTORNEY INVENTORS:
Stanislas TESZNER, Paul DURAND,
Philippe H. Morel, Pierre E. BRIERE
By [signature]
ATTORNEY INVENTORS:
Stanislas TESZNER, Paul DURAND,
Philippe H. MOREL, Pierre E. BRIERE
By [signature]
ATTORNEY

INVENTORS:

Stanislas TESZNER, Paul DURAND,
Philippe H. MOREL, Pierre E. BRIERE
By [signature]
ATTORNEY INVENTORS:
Stanislas TESZNER, Paul DURAND,
Philippe H. MOREL, Pierre E. BRIERE
By [signature]
ATTORNEY United States Patent Office 3,482,151

Patented Dec. 2, 1969

3,482,151

BISTABLE SEMICONDUCTOR INTEGRATED DEVICE

Stanislas Teszner, 49 Rue de La Tour, Paris, France; Paul Durand, 172 Boulevard Jean Mermoz, Chevilly-la-Rue, France; and Philippe H. Morel, 53 Rue Saint Placide, and Pierre E. Briere, 11 Rue Roli, both of Paris, France Filed Apr. 10, 1968, Ser. No. 720,184

Claims priority, application France, Apr. 11, 1967, 102,277

Int. Cl. H01l *11/02*

U.S. Cl. 317—235 6 Claims

ABSTRACT OF THE DISCLOSURE

A bistable semiconductor device comprising a semiconductor wafer of a given type of conductivity, a source electrode and a drain electrode at the surface of said wafer, an internal gate region of the opposite type of conductivity embedded in said wafer, at least one conductive channel of said given type of conductivity inside said wafer, adjacent to the gate region along a portion of its length and connecting the source and drain electrodes, and at least one constricted region in said channel having a cross-sectional area substantially smaller than the cross-sectional area of the channel in the part thereof adjacent to the gate region and located on the source side of said channel. This constricted region has the function of a source resistance, self-biasing the gate with respect to the source by the source drain current drop voltage across it. Longitudinal and transverse dimensions of this constricted region for obtaining good performances are discussed and determined.

This invention relates to semiconductor structures based on the same principle as the negative-resistance field-effect devices known as negative resistance tecnetrons disclosed in U.S. Patent 3,176,203 issued on Mar. 3, 1965, to Stanislas Teszner. These devices have two stable states between which the device changes over with the appearance of a negative resistance, so that the devices can be used as multivibrators, flip-flops, or equivalent circuits.

It is an object of this invention to provide bistable circuits using field-effect transistors whose gate is completely inside the transistor body and embedded therein and which are known as "integrated tecnetrons" when they comprise a single channel and "gridistors" when they comprise a plurality of parallel channels. These internal-gate negative-resistance field-effect structures have three electrodes, two ohmic-contact terminal electrodes called the one a source electrode and the other a drain electrode, and a third, which has a rectifying contact and which is the gate.

When a pulse of appropriate sign reverse the biasing of the gate junction, the bistable nature of devices of this kind becomes apparent. One stable state corresponds to non-conduction of current in the gate-source circuit with reverse-biasing of the gate junction, and the other stable state corresponds to a substantially free flow of current in such circuit, with forward-biasing of such junction. When in the non-conductive state the channel is flowed through mainly by majority carriers flowing between the source and the drain, whereas when conductive the gate-source section is flowed through by majority and minority carriers in substantially the same number as one another.

A main feature of such structures is the presence between the gate and the source of a relatively high resistance produced by a reduction of the semiconductor current flow cross-section. This reduced cross-section zone is disposed very near the gate so as to be invaded by minority carriers emitted by the forward-biased gate junction. As a secondary feature, such structures also have between the gate and the drain a resistance suitable for limiting the current delivered by the drain power supply and also formed by a reduced cross-section zone, the distance from such zone, the distance from such zone to the gate being immaterial.

The resistance between the gate and the source can be devised in two different ways corresponding to two forms of operation of the negative-resistance gridistor. In a first variant of the structures provided by the invention, the reduced cross-section zone between the gate and the source is distinguished in that its longitudinal dimension in the direction of current flow is such that the electric field in such zone is limited to below the range of values at which majority carrier mobility is found to vary appreciably. This variant corresponds to operation of the gridistor with substantially constant carrier mobility. In the second variant, such longitudinal dimension is so determined that the field in it reaches a value at which the charge carriers move at a speed which cannot be appreciably exceeded, corresponding to operation at a substantially constant carrier speed.

These principles apply to the various embodiments of the negative-resistance devices according to the invention both in the case in which the or each channel is substantially parallel to the main surfaces of the wafer, and in the case in which the or each channel is perpendicular to such surfaces.

The features and advantages of the invention will become more clearly apparent from the following description and accompanying drawings wherein:

FIG. 8 shows the structure of the negative-resistance tecnetron disclosed by U.S. Patent 3,176,203 above referred to;

Figure 9:
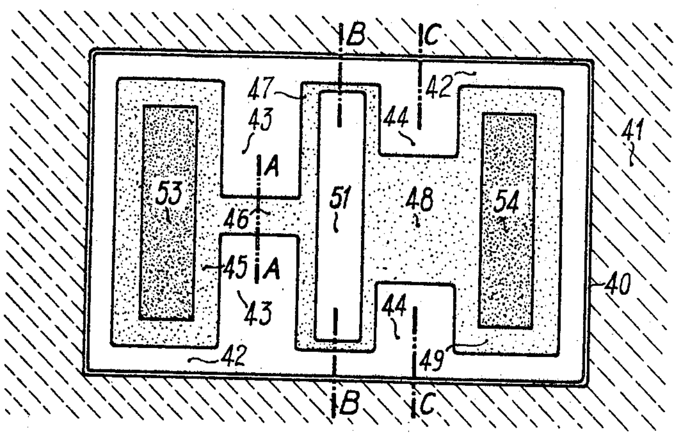
FIG. 9 is a plan view of a diode type horizontal-channel integrated negative-resistance tecnetron.
Figure 10A:
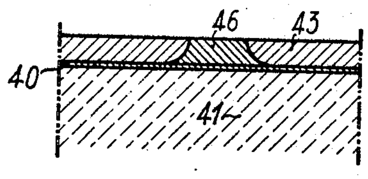
Figure 10B:
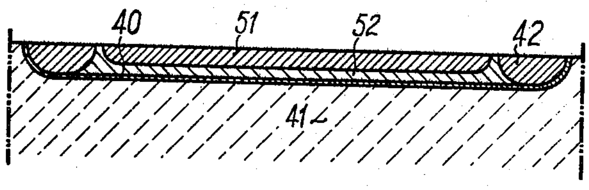
Figure 10C:
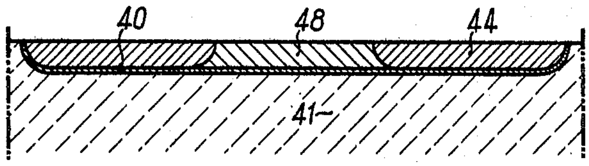
Figures 11, 12, 13A, 13B:
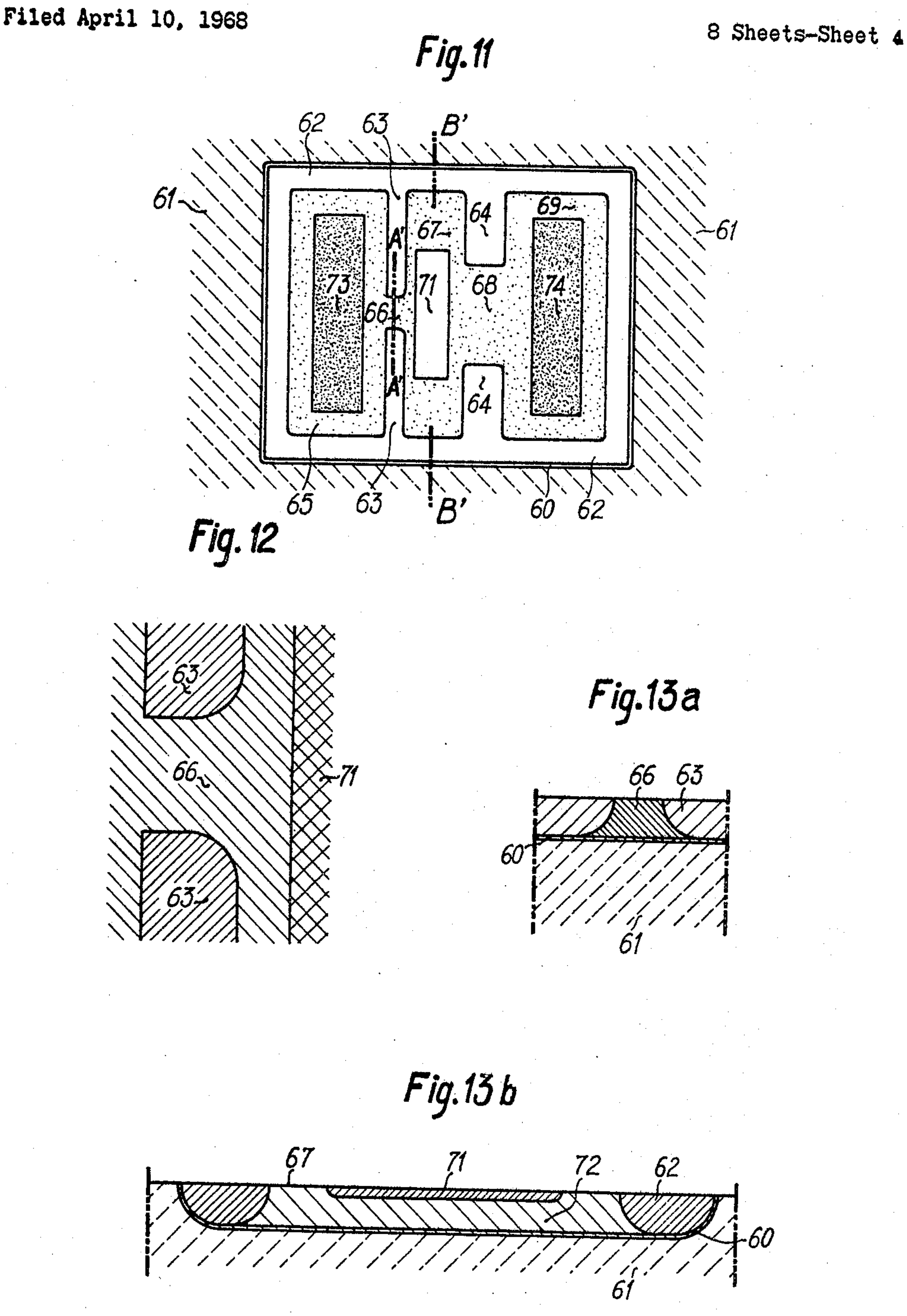
Figure 14:
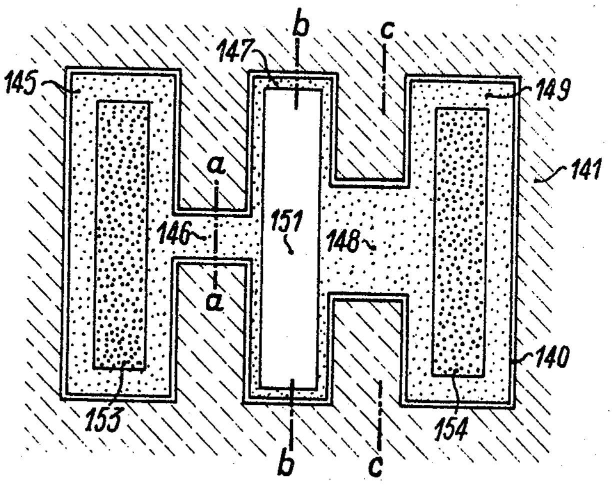
Figure 15A:
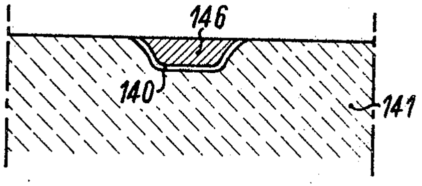
Figure 15B:
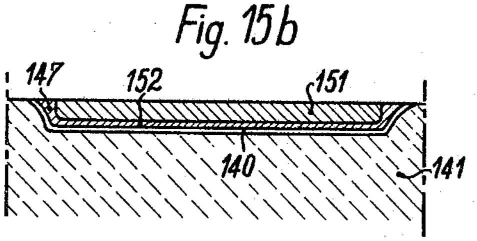
Figure 15C:
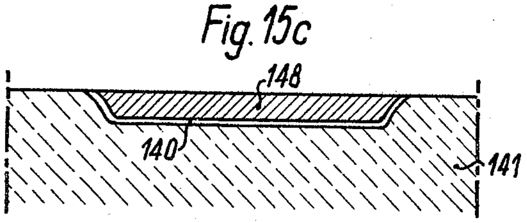
Figure 16:
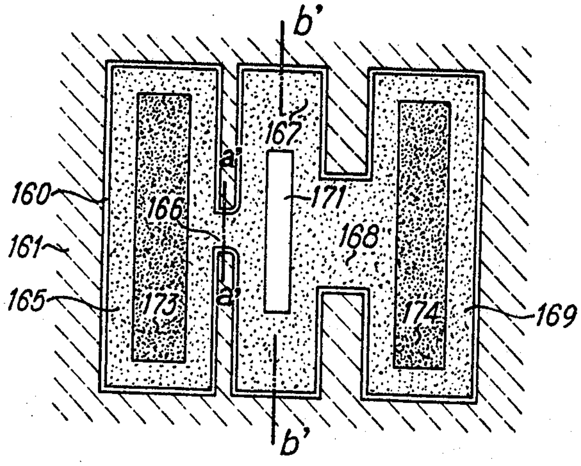
Figure 17A:
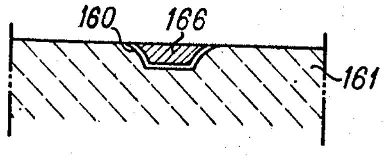
Figure 17B:
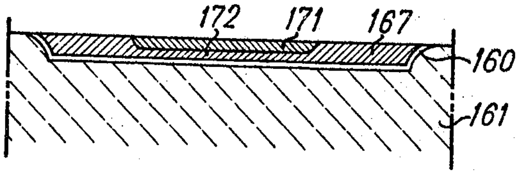
Figure 18:
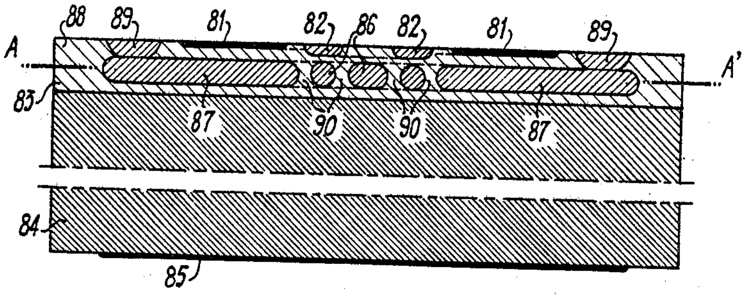
Figure 19:
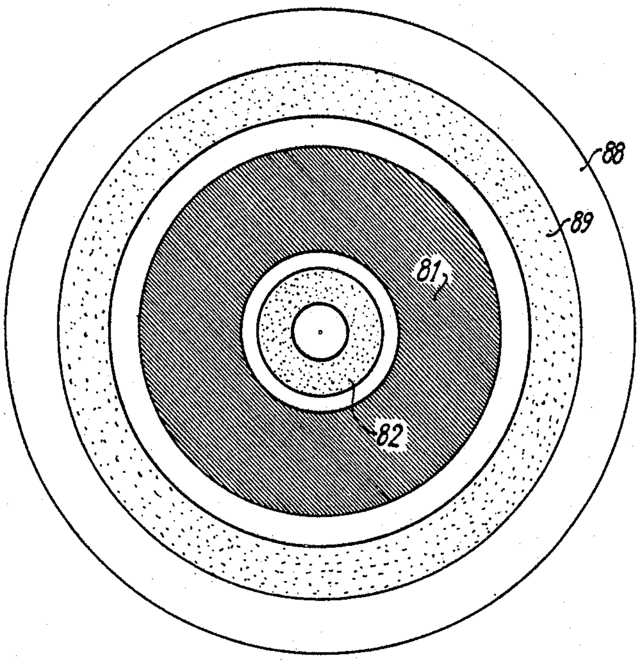
Figure 20:
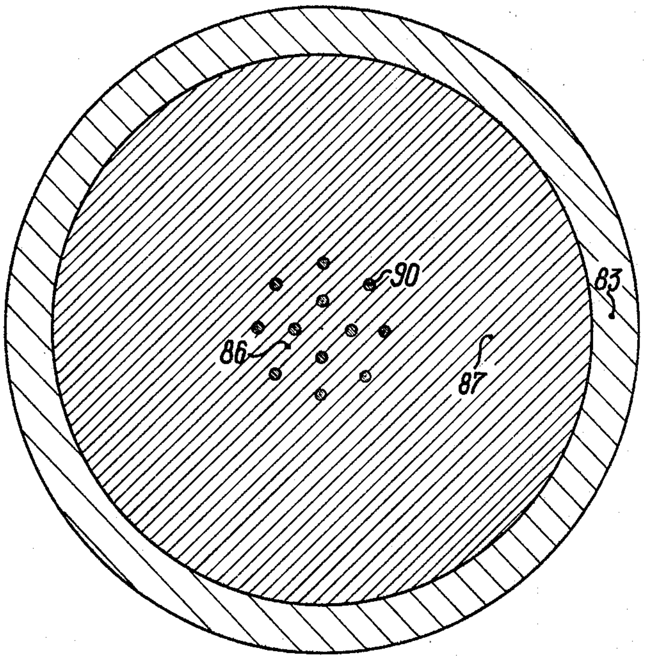

FIGS. 10*a*, 10*b* and 10*c* are sections in elevation, on the lines A—A, B—B and C—C respectively of FIG. 9, of the integrated tecnetron shown therein;

FIG. 11 is a plan view of a triode type horizontal-channel integrated negative-resistance tecnetron;

FIG. 12 is a view to an enlarged scale of a detail of the integrated tecnetron shown in FIG. 11;

FIGS. 13*a* and 13*b* are sections in elevation on the lines A'—A' and B'—B' respectively of FIG. 11;

FIG. 14 is a plan view of a variant of the tecnetron shown in FIG. 9;

FIGS. 15*a*, 15*b* and 15*c* are sections in elevation on the lines *a*—*a*, *b*—*b* and *c*—*c* respectively of FIG. 14;

FIG. 16 is a plan view of a variant of the tecnetron shown in FIG. 11;

FIGS. 17*a* and 17*b* are sections in elevation on the lines *a'*—*a'* and *b'*—*b'* respectively of FIG. 16;

FIG. 18 is a section in elevation of a vertical-channel negative-resistance gridistor;

FIG. 19 is a plan view of the gridistor shown in FIG. 18;

FIG. 20 is a section plan view on the line A–A' of FIG. 18, and

Figure 21:
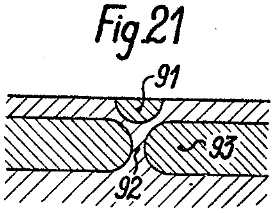

FIG. 21 shows a variant of a detail of the gridistor shown in FIGS. 18–20.

Figures 1, 2:
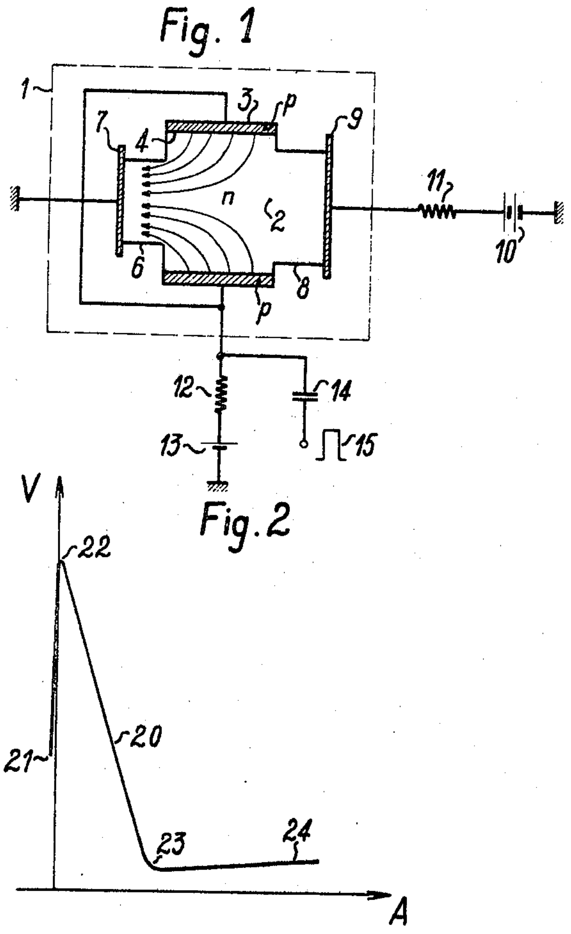
FIG. 1 is an explanatory diagram of the operation of prior art negative-resistance tecnetron.
FIG. 2 is the working current-voltage graph of the device shown in FIG. 1.

In FIG. 1, chain-line framing 1 extends around a basic diagram, reduced to its simplest form, of a non-integrated negative-resistance tecnetron disposed in a load circuit. The structure comprises a semiconductor channel 2, e.g. of n-type silicon, surrounded by a sheath 3 of p-type silicon, to form a gate junction 4 which can produce by field-effect a space charge variable extent in the channel 2 and thus modulate the effective cross-section thereof. In the equivalent circuit diagram in FIGS. 2 and 4, the reference 5 represents the system so far.

The structure also comprises a resistive portion 6 formed by a mechanical reduction of the channel, the resistance 6 extending to source 7; the structure also comprises a similarly formed resistive portion 8 extending to a drain electrode 9. On the assumption that power is supplied by a power pack 10 whose negative side is grounded and whose positive side is connected to the drain electrode 9, with or without the interposition of a resistance 11, if the gate 3 is directly connected to the source electrode 7 the voltage drop across the resistance 6 produces reverse self-biasing of the junction 4 and therefore, as a result of development of the space charge in the channel 2, a reduction in the cross-section thereof.

As FIG. 1 shows, with the source electrode 7 grounded, the gate electrode or sheath 3 is connected thereto via a load resistance 12 in series with a bias voltage source 13 whose negative side is also grounded. The resulting positive biasing of the junction 4 only partly offsets its negative self-biasing, and so the junction 4 stays reverse-biased and the device is in the nonconductive stable state in which a very small current, e.g. of the order of a nanoampere in the case of silicon at ambient temperature, flows through the gate-source circuit.

Figure 3:
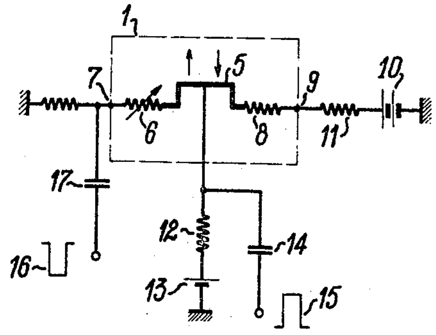
FIGS. 3 and 4 are equivalent circuits of the device shown in FIG. 1, FIG. 3 showing its use as a diode and FIG. 4 showing its use as a triode, with control by two coincident pulses.
Figure 4:
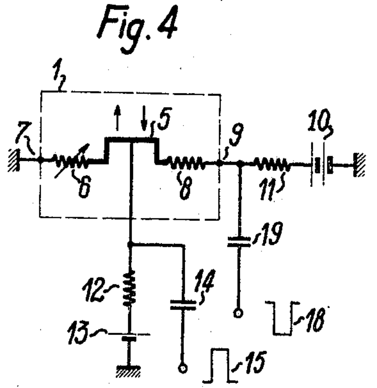

When the same is supplied via a capacitor 14 with a pulse 15 which is positive, if the tecnetron is n-type, and negative, if the tecnetron is p-type, and if such pulse has sufficient amplitude, the junction 4 becomes forward-biased and is flowed through by a relatively large current supplied by the bias source 13. The latter current is of course the result of a large injection of minority carriers with a concomitant formation of an equal number of majority carriers. This two-pole operation is represented in FIGS. 3 and 4 by the double arrows associated with the reference 5. Provided that the reduced cross-sectional zone forming the resistance 6 is disposed very near one end of the junction 4 and that the total distance thereform to the opposite end of the reduced cross-section zone (distance from the left-hand edge of the junction 4 to the source electrode 7) is less than minority carrier diffusion length, the resistance 6 is invaded by minority carriers so that its resistance almost disappears. Arrows in FIG. 1 denote this "invasion" of the zone 6, and the invasion is the reason why, in the equivalent circuit diagrams shown in FIGS. 3 and 4, the symbol for a variable resistance is used to represent the resistance 6. Self-biasing then disappears almost completely and the voltage between the terminals of the gate electrode and source electrode becomes very small, the current flowing through the circuit being limited mainly by the load resistance 12. The device is then in the second or conductive stable condition.

FIG. 2 shows the curve relating the current to the voltage in the gate 4 source circuit of FIG. 1, for a variation of the reverse-bias voltage of the gate. Starting from the first stable state 21, when the current is negative and almost zero, it is clearly seen that the positive pulse 15 makes the voltage rise rapidly as far as a point 22 at which the junction 4 becomes forward-biased, whereafter the curve 20 reverses, as represented by an abrupt voltage drop despite the current increase—i.e., a negative differential resistance occurs—the voltage reaching a minimum at the bend or valley point 23. Beyond the point 23 the differential resistance becomes positive and small in the portion 24 of the curve 20. A curve of this kind is characteristic of a multivibrator or flip-flop and makes the device according to the invention highly versatile, more particularly for electronic switching.

A device of this kind can be controlled by a single pulse, applied either to the gate 3, like the pulse 15 of FIG. 1, or to the source electrode 7, like the pulse 16 of FIG. 3, or to the drain electrode 9, like the pulse 18 of FIG. 4, provided that such pulse is a suitable polarity for the kind of conductivity and has sufficient amplitude to forward-bias the junction 4.

In some uses, more particularly switching, control is preferably achieved by two coincident pulses. Referring to the diagram in FIG. 3, and with an n-type tecnetron 1, the second pulse coinciding with the pulse 15 is a negative pulse 16 applied to the source electrode 7 via a capacitor 17. The pulse 16 has two effects, increasing the voltage between the gate and the source electrode and increasing the voltage between the source and drain electrodes. For these two effects not to offset one another, the changeover voltage corresponding to the point 22 on the curve 20 in FIG. 2 must be substantially independent of the source-drain voltage within a range on either side of the rate value of the last-mentioned voltage.

Figure 5:
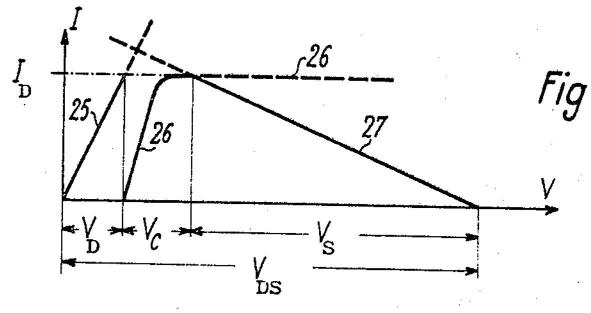
FIGS. 5 and 6 are graphs showing the source-drain voltage distribution between the constituent elements of the tecnetron of the diode and triode kinds shown in FIGS. 3 and 4 respectively.

This case is shown in FIG. 5, which gives the "voltage-current" curves of the three elements which make up the structure 1, the source resistance 6, the channel 2 and the drain resistance 8. These curves are respectively a straight line 25, a curve 26 and a straight line 27 and represent, for a given current $I_D$, the voltage drop $V_D$ in the drain resistance 8, the voltage drop $V_C$ in the below-gate channel 5, and the voltage drop $V_S$ in the source resistance 6. If $R_S$ represents the latter resistance, then, if the changeover voltage $V_S=I_D\times R_S$ is to be substantially independent of the source-drain voltage $V_{DS}=V_D+V_C+V_S$ the channel 5 must be saturated by the current $I_D$, as indicated by the curve 26 and its broken-line extension, and majority carrier mobility in the resistance 6 must be substantially independent of the electric field in the voltage range considered.

Figure 6:
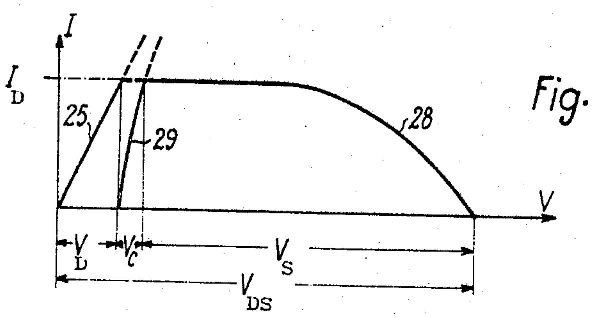

In the case shown in FIG. 4, the second pulse 18 which coincides with the pulse 15 is applied to the drain electrode 9 via a capacitor 19. Like the pulse 16, the pulse 18 is of opposite polarity to pulse 15 but, instead of acting inside the gate-source circuit, more particularly on the biasing of the junction 4, acts outside such circuit, the drain electrode acting as the control grid of a triode. The action of the pulse 18 is to reduce the voltage $V_{DS}$; for its action to be effective, therefore, in contrast to the previous case the voltage $V_S$ must closely follow the voltage $V_{DS}$. FIG. 6 shows that the best way of achieving this is for the curve 28 representing the voltage across the resistance 6 to correspond to saturation thereof whereas the curve 29 representing the voltage across the channel 2 is substantially linear; only the curve 25 representing the voltage across the resistance 8 remains the same as in the previous case. For this to occur, the main thing is that majority carrier speed in the resistance 6 be substantially constant within the particular range of voltage $V_S$ concerned and that the voltage $V_C$ be less than the voltage corresponding to saturation of the channel current.

Figure 7:
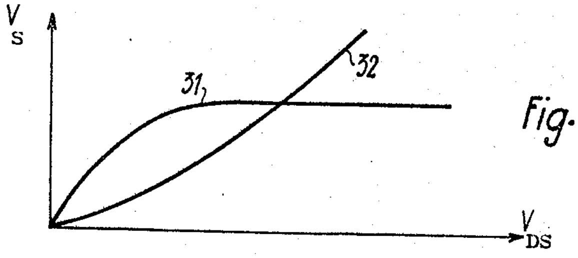
FIG. 7 shows how the triggering voltage of the devices shown in FIGS. 3 and 4 varies in dependence upon the voltage between their source and their drain.

One of the main features of the invention is the feature common to both cases—i.e., saturation of one of the structure elements, the below-gate channel (curve 26) or the source resistance (curve 28). FIG. 7 shows the two different forms 31, 32 of $V_S$ as a function of $V_{DS}$ for saturation of the first and second of these elements. The curve 31 shows $V_S$ substantially constant above a particular range of values of $V_{DS}$—i.e., $V_S$ becomes substantially independent of $V_{DS}$. On the other hand, the curve 32 shows $V_S$ closely related to $V_{DS}$. Since the scales are the same for $V_S$ and $V_{DS}$, above a particular range of values of $V_{DS}$, $\Delta V_S$ substantially equals $\Delta V_{DS}$. In other words, the curve 32 becomes parallel to the bisector of the coordinates axes. Another feature of the second case, which can be gathered from FIGS. 4 and 6, is that for the switching process—i.e., for the changeover from the non-conductive state to the conductive state—the two pulses encounter a high input impedance.

Clearly, therefore, in the first case (FIG. 3) the negative-resistance device behaves like a diode, whereas in the second case (FIG. 4) the device behaves like a triode.

A description will now be given of integrated tecnetron structures or, if more than one channel is provided, gridistor structures which can operate in both these manners, but reference will first be made to FIG. 8 which outlines the structure of the negative-resistance tecnetron disclosed in U.S. Patent 3,176,203 above referred to, the following structures being derived therefrom. The structure in FIG. 8 comprises three electrodes—a source electrode 33, a gate electrode 34 and a drain electrode 35; at both ends of a groove 36 containing the gate, there are constrictions 37, 38 which form the source resistance and drain resistance respectively. The factor determining whether one or the other of the two forms of operation hereinbefore described occurs is, for a given semi-conductor and for a given majority carrier concentration, the length of the constriction 37 and the diameter of the gate groove 36; increasing the length of the constriction 37 makes it possible to limit the electric field produced by drain current flow in the stable state when the gate current is cut off so as to maintain carrier mobility substantially constant; the drain current is limited by field effect in the gate groove 36 by an appropriate reduction of the diameter of such groove. On the contrary, reducing the length 37 leads to electric field strength such that mobility decreases substantially linearly with the field, so that carrier speed remains substantially invariable; on the other hand, gate diameter must be increased to offset drain current limitation by field effect.

FIGS. 9 and 10*a*, 10*b*, 10*c* are views, in plan and in section on the lines **10*a*—10*a*, 10*b*—10*b* and 10*c*—10*c*** respectively of FIG. 9, of a diode type integrated negative-resistance tecnetron having a channel parallel to the main surfaces of the wafer in which it is integrated. The tecnetron is formed in a semiconductor layer contained in an insulating sheath. It is known to provide such a sheath, which has an insulating inner lining, by chemical or electrochemical etching of a semiconductor wafer, e.g. silicon, until a negative sheath shape is obtained whereafter a surface layer of oxide is formed, e.g. by hot silicon oxidation, and polycrystalline silicon is deposited epitaxially to form the sheath support; then the opposite surface of the wafer is ground until the edge of the insulating lining is bared.

FIG. 9 is a plan view of the integrated tecnetron contained in a sheath 40 having an insulating lining and mounted on a polycrystalline silicon support. A frame 42 having arms 43, 44 is formed by diffusion of an n-type impurity, for instance, phosphorus, in the sheath 41 which is filled with monocrystalline p-silicon. Since the diffusion goes as far as the bottom of the sheath, the tecnetron structure in p-type silicon is accurately bounded. Two limb-like terminal zones 45, 49 are connected to a channel zone 47 by a narrow bridge 46 and a wide bridge 48 respectively, whereafter, and as FIG. 10*b* shows, a strip 51 bounding a channel 52 is formed in the channel zone 47 by diffusion of a Group V impurity, e.g. phosphorus. The n-type band 51 forms the gate electrode for producing—depending on whether it is reverse-biased—i.e., positively biased—or forward-biased—i.e., negatively biased—either a pinch-off effect in the channel 52 or an injection of minority carriers. The drain and source contacts are embodied on heavily doped p+ zones 53, 54 respectively previously formed by diffusion of a Group III impurity, e.g. boron. The gate electrode 51 is well separated from the frame 42 and arms 43, 44, an essential feature if the gate control voltage is not to be transmitted to the integers 42–44.

FIGS. 10*a* and 10*c* are sectioned views respectively showing the bridges 46, 48 forming the source and drain resistances respectively. These p-silicon bridges are edged on both sides by the n-type silicon arms 43, 44.

Particular fetaures of the structure are the length of the bridges 46, 48, especially of the source bridge 46 which, although shorter than the minority carrier diffusion length, is long enough for the electric field therein at all operating voltages not to exceed the range of values beyond which there is an appreciable drop in majority carrier mobility. As exemplary orders of magnitude, in the case of p-type silicon in which minority carrier diffusion length is approximately at least $150\mu$, and a maximum flip-flopping voltage of 25 volts, the length of the bridge 46 can be of the order of $100\mu$. The current-voltage characteristic 27 is therefore linear as shown in FIG. 5. Also, the channel is thin enough to ensure its saturation, at the given majority carrier concentration, at the rated operating voltages of the device even in the absence of gate biasing. Consequently, this device is, in the light of the preceding description, a diode type integrated negative-resistance tecnetron.

The structure shown in FIGS. 11, 12, 13*a* and 13*b* is of a triode type integrated tecnetron with its channel parallel to the wafer surface. Construction is very similar to the tecnetron hereinbefore described except as regards dimensioning of the constituent elements and the factors governing the choice of semiconductor substance, since in this case it is advantageous to use a substance which has ceteris paribus the greatest mobility-variation versus electric-field function. For instance, in the case e.g. of silicon the chief substrate is preferably n-type, in which event the frame 62 and its arms 63, 64, which are insulated from the substrate 61 by a silica layer 60, are p-type and, like the gate band 71, are formed by diffusion of a Group III impurity, e.g. boron.

FIG. 11 is a plan view of such an n-type integrated tecnetron comprising a source zone 65, gate zone 67 and drain zone 69 interconnected by bridges 66, 68 forming the source resistance and drain resistance respectively. The source contact and drain contact are devised on heavily doped surfaces 73, 74 of zones 65, 69, and the gate contact is devised on a p-type band 71. The bridge 66 is of reduced length; consequently, at all operating voltages the electric field in it reaches the range of values corresponding to the limit speed for the majority carriers, corresponding to saturation of the "current-voltage" characteristic 28 as shown in FIG. 6.

FIG. 12 is a plan view of the bridge 66, considerably enlarged to show its nozzle-like flare to facilitate penetration of the minority carrier flux emitted by the forward-biased gate junction. Purely by way of example, the bridge 66 can be something like $10\mu$ long in the case of n-type silicon and a minimum flip-flopping voltage of 10 volts.

FIGS. 13*a* and 13*b* are sections in elevation of the bridge 66 and gate zone 67 respectively. The section of the bridge 68 is homothetic in respect of the section of the bridge 48 and is therefore not shown. Relatively, the below-gate channel 72 is much thicker than 52 in FIG. 10*b* so that the operating point in the absence of bias is before the saturated zone of the current-voltage curve (see curve 29, FIG. 6). This provides the second characteristic of the structure to give it triode behavior.

FIGS. 14, 15*a*, 15*b* and 15*c* show a variant of the tecnetron shown in FIGS. 9, 10*a*, 10*b* and 10*c*, wherein the various structure elements are contained in a sheath which has an insulating lining and which is devised by the techniques hereinbefore mentioned. A source zone 145, a narrow bridge 146 forming the source resistance, a channel zone 147, a wide bridge 148 forming the drain resistance and a drain zone 149 are selectively etched in a single step in a semiconductor material. These elements are surrounded by insulating lining 140 of silicon oxide. The rear surface of the semiconductor wafer is ground as far as the insulating lining. The gate electrode 151 is formed by selective diffusion into the channel zone 147 of an impurity of the opposite type to the majority impurity of the initial semiconductor material. The source and drain contacts are formed by high-concentration diffusion of an impurity of the same group as the majority impurity of the initial semiconductor. This diffusion is effected at a place 153 on the source zone 145 and at a place 154 on the drain zone 149. To facilitate the welding of the connections a deposition can be made, e.g. in vacuo, of a metal which can provide an ohmic contact with the heavily doped source and drain parts 153, 154 and with the gate zone 151.

FIGS. 15*a*, 15*b* and 15*c* are respective sections on the lines *a—a*, *b—b* and *c—c* of FIG. 14. FIG. 15*a* shows the source resistance 146 separated from the substrate 141 by the insulating layer 140. FIG. 15*b* shows the gate zone 151 which bounds the channel 152 in the thickness of the channel zone 147, the insulating layer 140 providing separation from the substrate 141. FIG. 15*c* shows the drain resistance 148, the insulating layer 140 and the substrate 141. The geometric and electrical characteristics of the integrated tecnetron shown in FIGS. 14, 15*a*, 15*b*, 15*c* are the same as for the integrated tecnetron shown in FIGS. 9, 10*a*, 10*b*, 10*c*, the only difference being a technological modification in construction.

Similar considerations apply to the variant, shown in FIGS. 16, 17*a* and 17*b* of the device shown in FIGS. 11, 12, 13*a*, 13*b*.

In this variant, which is shown in plan in FIG. 16, an insulating lining 160 bounds a source zone 165 in a substrate 161, a source resistance 166, a channel zone 167, a drain resistance 168 and a drain zone 169. A gate strip 171 is obtained by diffusion of an impurity providing the opposite kind of conductivity to the conductivity of the initial semiconductor, and the heavily doped source zone 173 and drain zone 174 are obtained by a high-concentration diffusion of an impurity of the same group as the majority impurity of the initial semiconductor. FIGS. 17*a* and 17*b*, which are sections on the lines *a′–a′* and *b′–b′* of FIG. 16, respectively show the source resistance 166 bounded by the insulating lining 160 in the substrate 161, and the gate zone 171 delimiting the channel 172 in the thickness of the channel zone 167, the insulating lining 160 providing separation from the substrate 161.

FIGS. 18–21 relate to a negative-resistance gridistor having channels perpendicular to the main surfaces of the semiconductor wafer and formed in a surface layer of a semiconductor wafer, e.g. silicon. A wafer part 84 which serves as a support or substrate for the gridistor is heavily doped, preferably with an $n^+$ material, and has a source electrode 85 on one main surface. An n-type layer 83 is formed on the other main surface of the wafer either epitaxially or by the initially n-type wafer 84 being heavily doped by diffusion throughout its thickness except for the layer 83. A Group III impurity, e.g. boron, is then diffused through a mask covering the periphery of the exposed surface of the layer 83 and a number of places 90 regularly distributed in the central part of such layer, in the manner shown in FIG. 20. The result is a p-type gate 86 integral with a framing membrane 87 of the same kind of conductivity. A second n-type layer 88 having the same order of resistivity as the layer 83 is deposited thereon epitaxially. During this operation there is diffusion between the layer 83 and the layer 88 so that the gate 86 and membrane 87 are extended in the new layer by exodiffusion. A p-type ring 89 is then diffused in the exposed surface of the layer 88 so as to touch the membrane 87 near its periphery and thus insulate the n-type region above the gate 86 from the remainder of the wafer. An annular p-type gate 82 which is the very gate electrode is then diffused in that part of the layer 88 which covers the gate 86 but without contacting the same, whereafter an $n^+$ type annular drain 81 is diffused between the gate 82 and the ring 89.

Figure 8:
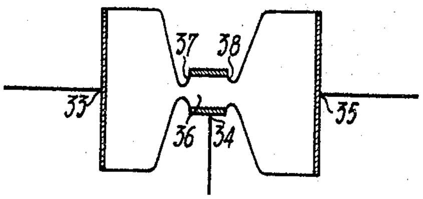

The axial extent of the resulting structure is much smaller than the axial extent of the device shown in FIG. 8. The annular drain 81 is coplanar with the annular gate 82. The passageways or channels 90 which extend through the meshes of the gate 86 form the source resistance and the passageway between gates 86 and, 82 forms the conductive channel proper.

As in FIGS. 11 and 16, the channels 90 are short enough to ensure that the limit speed of the majority carriers in the operating conditions is substantially reached, and the cross-section of the channels 90 can be small enough for the voltage drop at their terminals to produce an automatic pinch-off effect by field effect.

Since the ring 89 and gate 82 have to be diffused to different depths, an extra diffusion step is necessary. The variant shown in section in FIG. 21, as well as obviating this disadvantage, since in the device shown in FIG. 21 the gate electrode 91 is diffused to the same depth as the outer ring 89 in FIGS. 18 and 19, improves the efficiency of injection by the gate-electrode 91 into the channel 94 forming the source resistance. The gate 91 can be annular, in which event the channel 94 is also annular. The gate 91 can take the form of a number of hemispherical buttons (or a single such button in the case of an integrated tecnetron), in which case the same number of circular cross-section channels 92 are provided opposite the such buttons.

Of course, the materials used and the structural shapes and their actuation can vary without departure from the scope of the invention, provided that the guide lines hereinbefore set forth are followed. For instance, it is possible to use materials other than silicon, inter alia germanium intermetallic compounds of Groups III and V of the Periodic Table of Elements.

Purely by way of explanation and to give some idea of values, the following is a list of the main electrical features of negative-resistance gridistors and integrated tecnetrons:

| | |
|---|---|
| Flip-flopping voltage ________________volts__ | 5–50 |
| Ratio of flip-flopping voltage to drain voltage ____________________________volts__ | 0.5–0.95 |
| Minimum voltage (valley point) after flip-flopping ____________________________volts__ | 0.5–2 |
| Non-conductive differential resistance _ohms__ | $10^{12}$–$10^{10}$ |
| Conductive differential resistance for currents of from 20 to 500 ma. ____________ohms__ | 40–0.5 |
| Time for flip-flopping from the non-conductive to the conductive state ______________ns__ | 5–50 |
| Controlled return time to non-conductive state ______________________________ns__ | 10–200 |

What we claim is:

1. A bistable semiconductor device comprising a semiconductor wafer of a given type of conductivity, a source electrode and a drain electrode at the surface of said wafer, an internal gate region of the opposite type of conductivity embedded in said wafer, at least one conductive channel of said given type of conductivity inside said wafer, adjacent to the gate region along a portion of its length and connecting the source and drain electrodes, and two constricted regions in said channel having a cross-sectional area substantially smaller than the cross-sectional area of the channel in the part thereof adjacent to the gate region and respectively located on the source side and the drain side of said channel.

2. A bistable semiconductor device as set forth in cliam 1, in which the portion of the conductive channel adjacent to the gate region has a cross-sectional area small enough for allowing the voltage drop of the source-drain current along said portion to provoke the pinching-off of the channel, and the length of the constricted region of the channel on the source side is smaller than the diffusion length of the minority carriers and large enough for the electrical field in said constricted region to be smaller than the critical electrical field value at which the carrier mobility decreases with increasing field.

3. A bistable semiconductor device as set forth in claim 1, in which the portion of the conductive channel adjacent to the gate region has a cross-sectional area large enough for preventing the voltage drop of the source-drain current along said portion from provoking the pinching-off of the channel, and the length of the constricted region of the channel on the source side is smaller than the diffusion length of the minority carriers and small enough for the electrical field in said constricted region to be larger than the critical electrical field value at which the carrier velocity is susbtantially constant.

4. A bistable semiconductor device as set forth in claim 1, in which the semiconductor wafer of a given type of conductivity is a thin plate having an insulated bottom surface, the source, drain and conductive channel are made from semiconductor material of the opposite type of conductivity, are shaped like elongated rectangular regions parallel to and spaced apart from one another and have a depth equal to the whole thickness of the thin plate, the gate is made from semiconductor material of said given type of conductivity, is shaped like an elongated rectangular region substantially overlaying the channel rectangular region and has a depth smaller than the thickness of the thin plate, whereby a conductive channel is inserted between the insulated bottom surface and the gate, and the two constricted regions of the channel are made from semiconductor material of the opposite type of conductivity and are shaped like rectangular bridge regions transverse to the source, channel and drain regions, respectively connecting the source region to the channel region and the channel region to the drain region.

5. A bistable semiconductor device as set forth in claim 4, in which the semiconductor material of the opposite type of conductivity is p-type silicon, the length of the transverse rectangular region connecting the source and channel regions is comprised between 75 and 150$\mu$ and the thickness of the channel region between the insulated bottom region and the gate region is small enough for the channel being pinched-off by the drop voltage of the source-drain current along the portion of the channel adjacent to the gate region.

6. A bistable semiconductor device as set forth in claim 4, in which the semiconductor material of the opposite type of conductivity is n-type silicon, the length of the transverse rectangular region connecting the source and channel regions is comprised between 5 and 20$\mu$, and the thickness of the channel region between the insulated bottom region and the gate region is large enough for the channel not being pinched-off by the drop voltage of the source-drain current along the portion of the channel adjacent to the gate region.

References Cited

UNITED STATES PATENTS 3,022,472 2/1962 Tanenbaum et al. ---- 317—235

JERRY D. CRAIG, Primary Examiner

U.S. Cl. X.R.

307—304